United States Patent

[11] 3,596,198

[72] Inventors Shigeru Niki;
Takanobu Hashimoto; Michio Yoshioka, all of Tokyo-to, Japan
[21] Appl. No. 772,660
[22] Filed Nov. 1, 1968
[45] Patented July 27, 1971
[73] Assignee Kokusai Denki Kabushiki Kaisha
Tokyo-to, Japan
[32] Priority July 9, 1968
[33] Japan
[31] 43/47512

[54] VOLUME CONTROLLER
3 Claims, 7 Drawing Figs.

[52] U.S. Cl. .......... 330/59, 330/103, 330/69, 330/146, 330/185
[51] Int. Cl. .......... H03f 17/00, H03f 1/36
[50] Field of Search .......... 330/59

[56] References Cited
UNITED STATES PATENTS

| | | | |
|---|---|---|---|
| 3,258,707 | 6/1966 | Lawrence, Jr. | 330/59 |
| 3,260,945 | 7/1966 | Kalmus et al. | 330/59 X |
| 3,436,671 | 4/1969 | Fenton et al. | 330/59 X |

*Primary Examiner*—Nathan Kaufman
*Attorneys*—Robert E. Burns and Emmanuel J. Lobato

ABSTRACT: A volume controller for controlling the voltage of at least one signal transmitted in a signal path in matching with the characteristic impedance of the signal path, where the signal is branched to two differential outputs by a branch circuit comprising a bridge circuit of four resistance-arms to amplify the difference between the two differential outputs in a difference amplifier which has a feedback circuit comprising a variable resistor connected between the output of the difference amplifier and one of two inputs of the difference amplifier. The voltage of the output of the difference amplifier can be controlled within an extremely wide level range in response to control of the control means which gangs the variable resistor of the feedback circuit and variable one of the four resistor-arms of the bridge circuit.

VOLUME CONTROLLER

This invention relates to volume controllers for controlling the voltage of signal transmitted in a signal-path, such as audio line, and more particularly to a volume control unit suitable to an element of a fader.

There have been proposed many kinds of volume controllers of this type. However, conventional volume controllers have disadvantages, such as narrow control range, fluctuation of distortion factor of the controlled signal in response to the change of signal-level, and mismatching with the characteristic impedance of the transmission line. Moreover, the conventional volume controller is usually unsuitable to be remote-controlled by an external signal or signals.

An object of this invention is to provide volume controllers eliminatable of the above mentioned disadvantages and having an extremely wide control range.

Another object of this invention is to provide a volume control unit of a fader suitable to be remote-controlled by an external control voltage.

The principle of this invention will be better understood from the following more detailed discussion taken in conjunction with the accompanying drawings, in which the same or equivalent parts are designated by the same reference numerals, characters and symbols, and in which.

Figure 1:
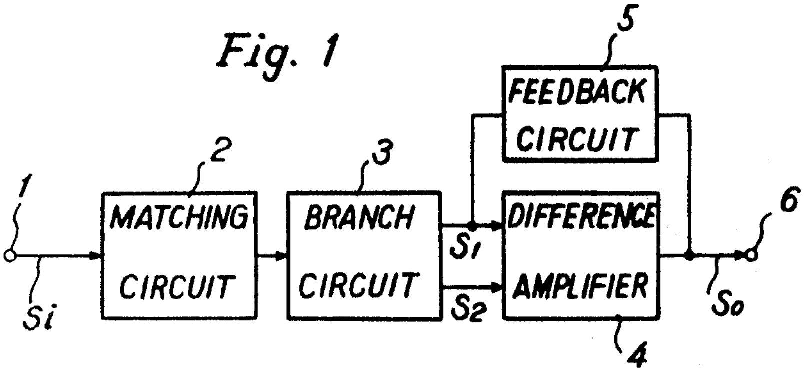
FIG. 1 is a block diagram for describing the principle of this invention.

With reference to FIG. 1, the principle of this invention will first be described. A matching circuit 2 matches with the line impedance within the range of all operation frequencies. An input signal $S_i$ applied from an input terminal 1 passes through the matching circuit 2 and is applied to a branch circuit 3, which produces two branched outputs $S_1$ and $S_2$. These two outputs $S_1$ and $S_2$ are respectively applied to two inputs of a difference amplifier 4. The output of this difference amplifier 4 is fed back to one of the two inputs of the difference amplifier 4 through a feedback circuit 5. An output signal $S_o$ is derived from an output terminal 6 connected to the output of the difference amplifier 4. Details of the construction and operation of this volume controller will be understood from the following description of embodiments of this invention.

Figure 2:
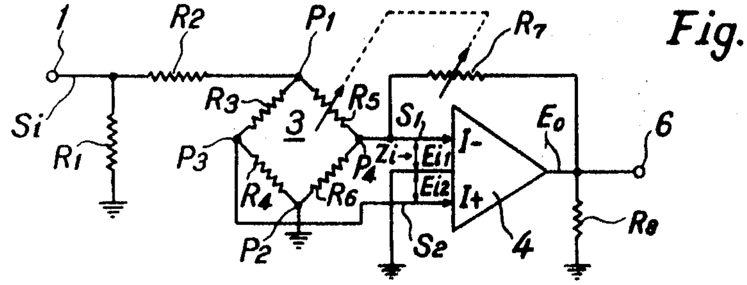
FIG. 2 is a circuit diagram for illustrating an embodiment of this invention.

FIG. 2 shows an embodiment of the volume controller of this invention having the above-mentioned construction. In FIG. 2, a resistor $R_1$ is a matching resistor, and a resistor $R_2$ is a coupling resistor. The branch circuit 3 is composed of a bridge circuit having four resistor-arms (resistors $R_3$, $R_4$ and $R_6$ and a variable resistor $R_5$) and if two pair of opposed terminals ($P_1$, $P_2$) AND ($P_3$, $P_4$). The signal $S_i$ is applied, through the resistor $R_2$, to one pair of opposed terminals $P_1$ and $P_2$, and two outputs $S_1$ and $S_2$ branched at the other of opposed terminals ($P_3$, $P_4$) are respectively applied to a minus input terminal $I_1$ of the difference amplifier 4 and a plus input terminal $I_+$ thereof. A resistor 8 is a matching resistor of output side. A variable resistor $R_7$ is a feedback resistor and gangs with the variable resistor $R_5$.

In the above-mentioned construction, if the difference amplifier 4 has a gain G with respect to the input signal $S_1$ of the minus terminal $I_1$, the input impedance $Zi$ of the difference amplifier 4 at the minus terminal $I_1$ can be indicated as follows:

$$Zi=\frac{r_7}{1+G}=\frac{r_7}{1+(r_7/r_6)}=\frac{1}{(1/r_6)+(1/r_7)} \qquad (1)$$

where reference $r_6$ and $r_7$ are respectively resistances of the resistors $R_6$ and $R_7$.

Therefore, the equilibrium condition of the bridge circuit 3 can be indicated as follows:

$$\frac{r_3}{r_4}=\frac{r_5}{r_6//Z_i}=\frac{r_5}{\dfrac{1}{1/(r_6/2)+1/r_7}} \qquad (2)$$

where references $r_3$ and $r_4$ are respectively resistances of the resistors $R_3$ and $R_4$ while the term $r_6$ $//Z_i$ indicates a resultant resistance of parallel-connected resistors $r_6$ and $Z_i$.

If each of the resistors $R_5$ and $R_7$ is a variable resistor of resistance 500 kilo-ohms, and the bridge circuit 3 balances when the variable resistor $R_7$ has the value of 500 ohms, then the equation (2) is as follows, where resistances $r_3$ and $r_6$ have the respective values of 40 kilo-ohms and 3 kilo-ohms:

$$\frac{40000}{r_4}=\frac{500}{\dfrac{1}{1/(1500)+1/500}}=\frac{500}{3.75}=1.365 \qquad (3)$$

Therefore, the resistance $r_4$ of the resistor $R_4$ becomes a value 29.4 kilo-ohms.

Moreover, the equilibrium condition of the bridge circuit 3 can be indicated as follows by use of the resistances $r_3$, $r_4$, $r_5$, $r_6$ and $r_7$ from the equation (2):

$$r_5=\frac{r_3}{r_4}\left(\frac{1}{\left(\frac{1}{r_6/2}\right)+(1/r_7)}\right) \qquad (4)$$

If respective input voltages of the minus and plus terminals $I_1$ and $I_+$ of the difference amplifier 4 are assumed as voltages $E_{i1}$ and $E_{i2}$ respectively, since influences from relatively high resistances $R_2$, $R_3$ and $R_4$ are negligible, the output voltage $E_o$ of the difference amplifier 4 can be indicated as follows:

$$E_0=\frac{r_6+r_7}{r_6}\,\frac{dE_i\sim E}{i_2 \quad i1} \qquad (5)$$

Where "$dE_i$" indicates a difference between the voltages $E_{i1}$ and $E_{i2}$. In this case, since the resistance $r_6$ of the resistor $R_6$ is constant, the output voltage $E_o$ can be indicated by a function of the resistance $r_7$ of the resistor $R_7$ and the input voltages $E_{i1}$ and $E_{i2}$. Moreover, if the bridge circuit 3 is balanced so that the voltages $E_{i1}$ and $E_{i2}$ are equal to each other, the output voltage $E_o$ becomes zero and the attenuation in the volume controller of this invention becomes maximum. The output voltage $E_o$ is adjustable to a desired value in accordance with change of the resistance $r_7$ of the resistor $R_7$ and of the voltages $E_{i1}$ and $E_{i2}$.

Figure 3:
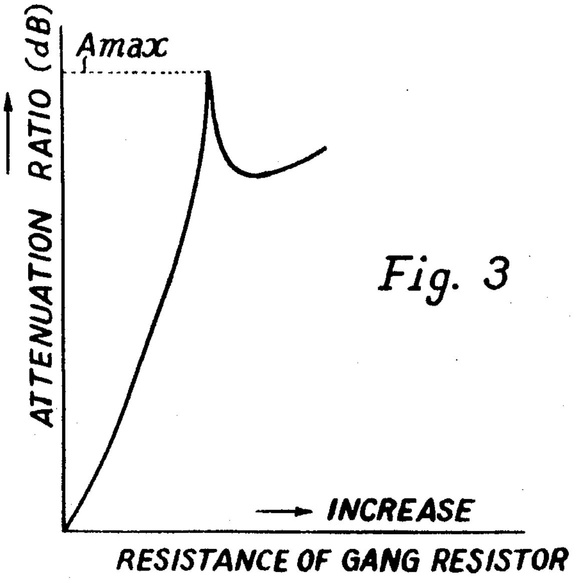
FIG. 3 illustrates a characteristic curve for describing the operation characteristic of the embodiment shown in FIG. 2.

FIG. 3 shows an attenuation characteristic of the embodiment shown in FIG. 2 in case where the variable resistors $R_5$ and $R_7$ have the same change-characteristic of resistance and the maximum resistance 500 kilo-ohms. The maximum attenuation $A_{max}$ of this characteristic exceeds 120 db. (decibels). Accordingly, it is understood that the attenuation ratio of the output voltage $E_o$ to the input signal $S_i$ applied from the input terminal 1 can be changed within an extremely wide changing range in accordance with change of the resistance of a gang resistor comprising the variable resistors $R_5$ and $R_7$.

Figure 4:
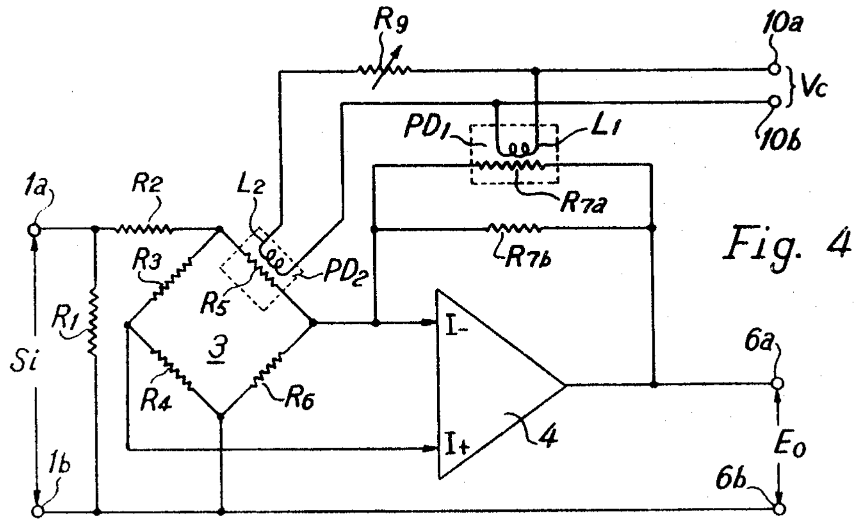
FIG. 4 is a circuit diagram for illustrating another embodiment of this invention.

FIG. 4 shows another embodiment of this invention in which attenuation ratio of an output voltage $E_o$ to a voltage of input signal $S_i$ can be changed by an external control voltage $V_c$ applied across a pair of control terminals 10*a* and 10*b*. In this embodiment, the variable resistor $R_5$ is composed of a photoconductive cell whose resistance varies with the illumination on the cell, and the resistor $R_7$ is composed of a resistor $R_{7b}$ and a photoconductive cell $R_{7a}$ which are connected in parallel with each other. Such photoconductive cell can be formed by use of cadmium sulfide (CdS) wafer. The photoconductive cells $R_5$ and $R_{7a}$ are respectively illuminated by small electric lamps $L_2$ and $L_1$ which are excited by an external control voltage $V_c$ supplied, as a manipulated variable, across the terminals 10*a* and 10*b*. The photoconductive cell $R_{7a}$ and the small electric lamp $L_1$ forms a voltage-photoresistance transducer $PD_1$, and the photoconductive cell $R_5$ and the small electric lamp $L_2$ forms similarly a voltage-photoresistance transducer $PD_2$. Accordingly, the resistances of the photoconductive cells $R_5$ and $R_{7a}$ are commonly controlled by the external control voltage $V_c$. A variable resistance $R_9$ is employed for compensating discordance between characteristics of the transducers $PD_1$ and $PD_2$. Other parts are the same as those of the embodiment shown in FIG. 2.

Figure 5A:
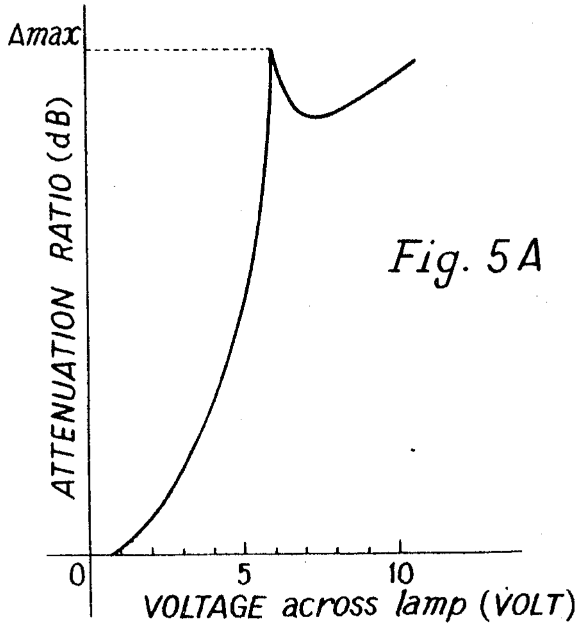
FIGS. 5A and 5B illustrate characteristic curves for describing the operation characteristic of the embodiment shown in FIG. 4.
Figure 5B:
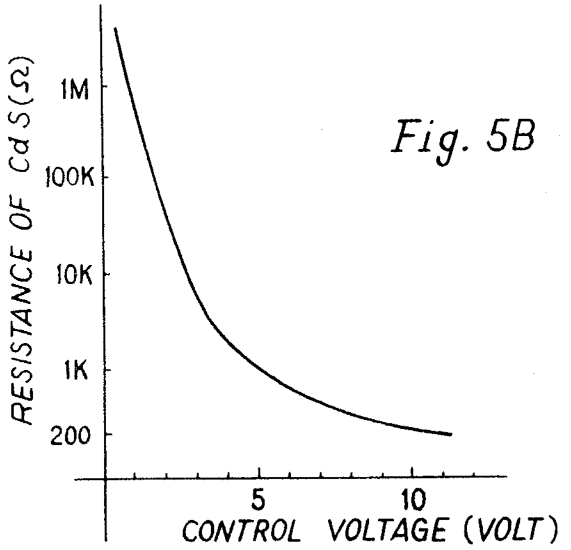

In each of the photoconductive cells $R_5$ and $R_{7b}$ is formed by use of CdS wafer, a characteristic curve shown in FIG. 5B is obtained as the characteristic of the transducers $PD_1$ and $PD_2$. In this case, the attenuation ratio of the output voltage $E_o$ to the voltage of the input signal $S_i$ can be changed as shown in FIG. 5A in response to change of the voltage across the electric lamps $L_1$ and $L_2$. In this characteristic, the maximum attenuation ratio $A_{max}$ is obtained at six volts of the control voltage $V_c$.

Figure 6:
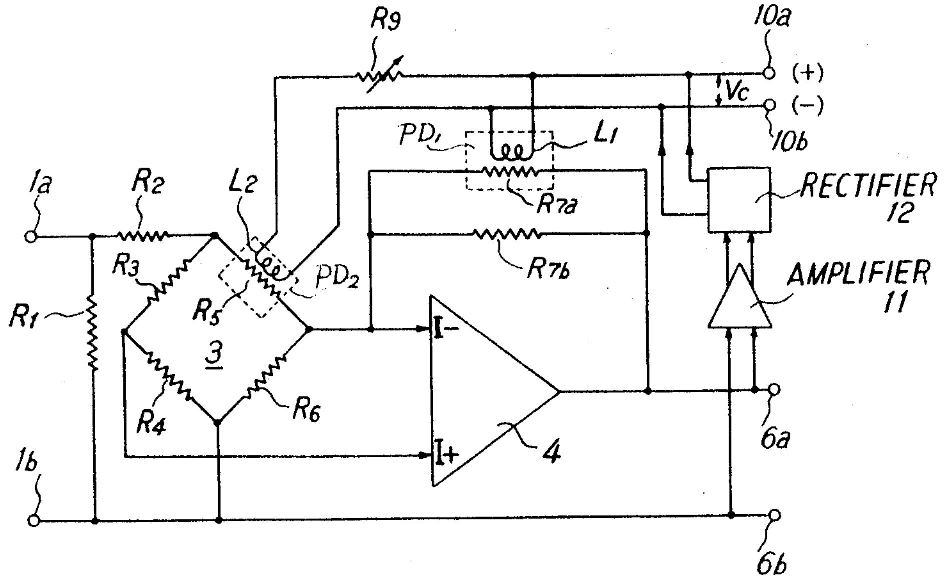
FIG. 6 is a circuit diagram for illustrating another embodiment of this invention.

FIG. 6 shows another embodiment of this invention in which the output voltage $E_o$ can be controlled by an external control voltage $V_c$ and moreover the controlled output voltage $E_o$ can be automatically regulated to a substantially constant level. In this embodiment, the output voltage $E_o$ is rectified by a rectifier (e.g.; full-wave rectifier 12) after amplification by an amplifier 11. The rectified output of the full-wave rectifier 12 is superposed on the external control voltage $V_c$ so as to coincide with the polarity of the external control voltage $V_c$. Accordingly, this embodiment has an automatic gain control loop. If the output voltage $E_o$ increases, the attenuation ratio increases also. Therefore, the controlled output voltage $E_o$ of the embodiment shown in FIG. 6 can be regulated at a constant level. The time constant of the automatic gain control loop can be determined at a desired value by inserting, at the output side of the full-wave rectifier 12, a smoother having a time constant which corresponds to the desired value.

As mentioned above, the volume controller of this invention can control an input signal or signal within a wide level range. Moreover, the embodiment shown in FIGS. 4 and 6 can perform automatically such control. Therefore, the volume controller of this invention is suitable for use as an element of a fader which is employed to control the level of each of two seperated but related audiosignals or to control simultaneously the levels of combined audiosignals in an audio system, such as broadcast system.

What we claim is:

1. A volume controller for controlling the voltage of at least one signal transmitted in a signal path, comprising:

a bridge circuit including four resistor arms and having a pair of opposed input terminals and a pair of opposed output terminals, wherein one of said resistor arms comprises a first variable resistor;

a matching circuit connected between said bridge circuit input terminals and the output of a signal path;

a difference amplifier having an output terminal, and having a pair of input terminals connected to the output terminals of said bridge circuit for amplifying the difference between signals at said bridge circuit output terminals;

a feedback circuit comprising a second variable resistor connected between the amplifier output terminal and one of the amplifier input terminals;

and control means for simultaneously varying said first and second variable resistors; wherein the voltage at the amplifier output can be attenuated over a wide range in response to operation of said control means to vary said first and second variable resistors.

2. A volume controller according to claim 1, in which said first and second variable resistors are photoconductive cells; and in which the control means comprises two small electric lamps for illuminating the respective photoconductive cells, and a variable voltage source connected to said lamps for varying the illumination thereof.

3. A volume controller according to claim 2, further comprising a rectifier connected to said amplifier output terminal and means connected between said rectifier and said variable voltage source for superposing a rectified amplifier output signal on the voltage of said variable voltage source, whereby the controlled output of the difference amplifier is maintained at a substantially constant level.